C. CHAMBERS, Jr.
DOUGH MIXING MACHINE.
APPLICATION FILED AUG. 16, 1906.
921,202.
Patented May 11, 1909.
6 SHEETS—SHEET 1.
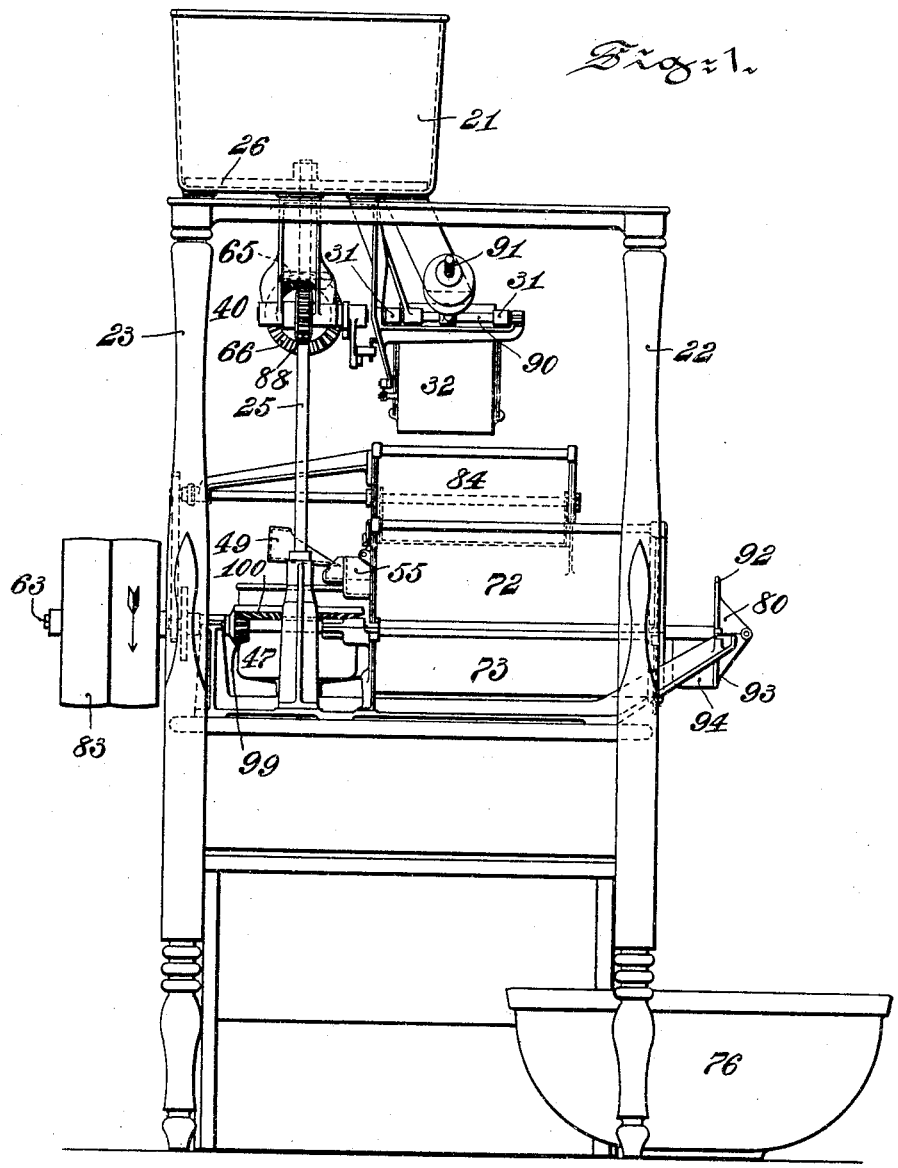
WITNESSES:
INVENTOR
ATTORNEY.

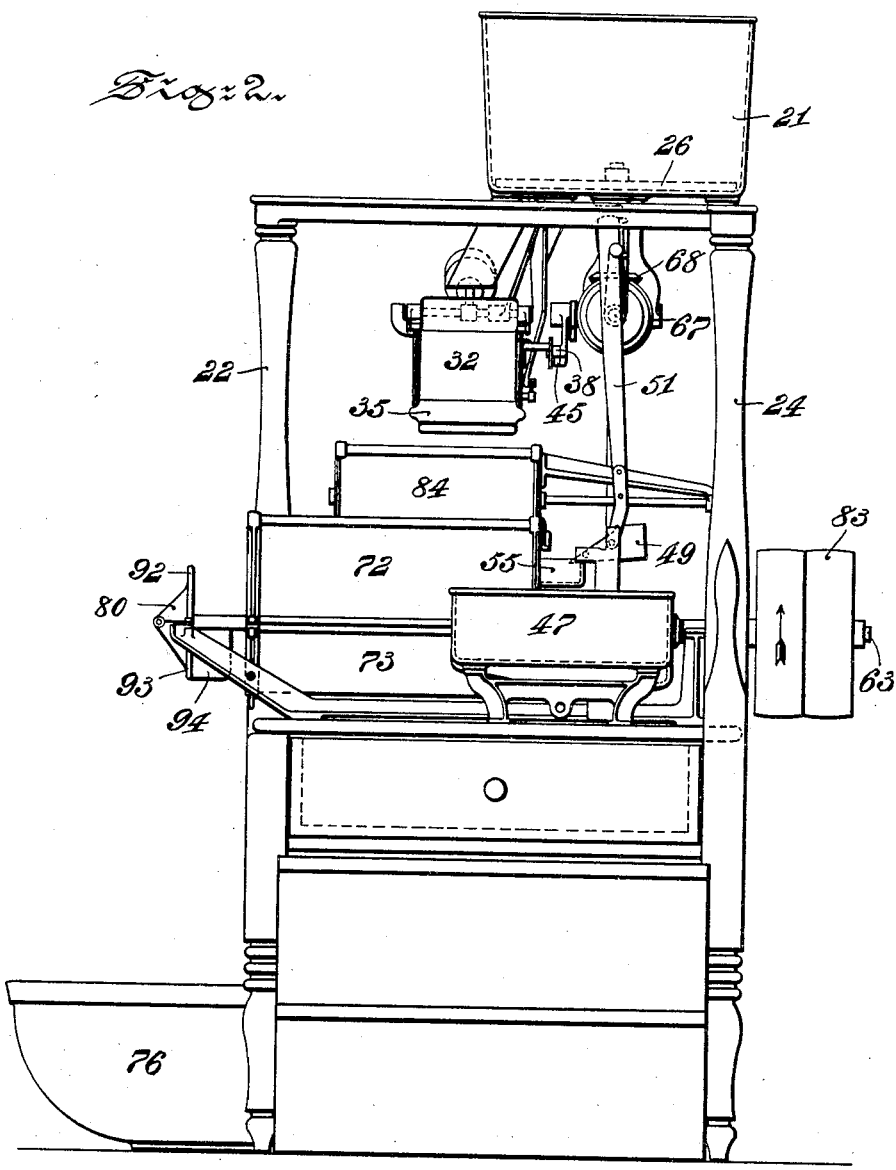

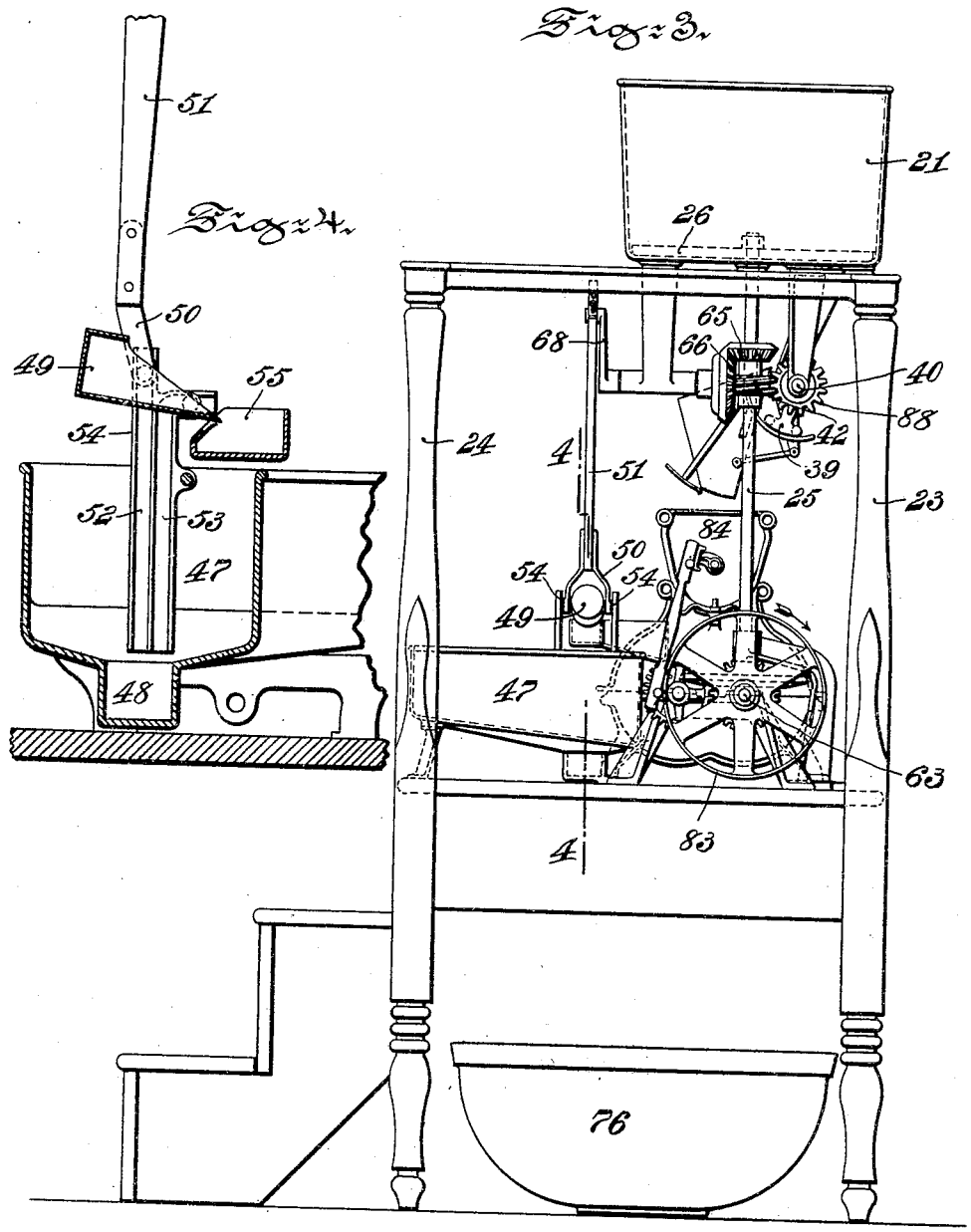

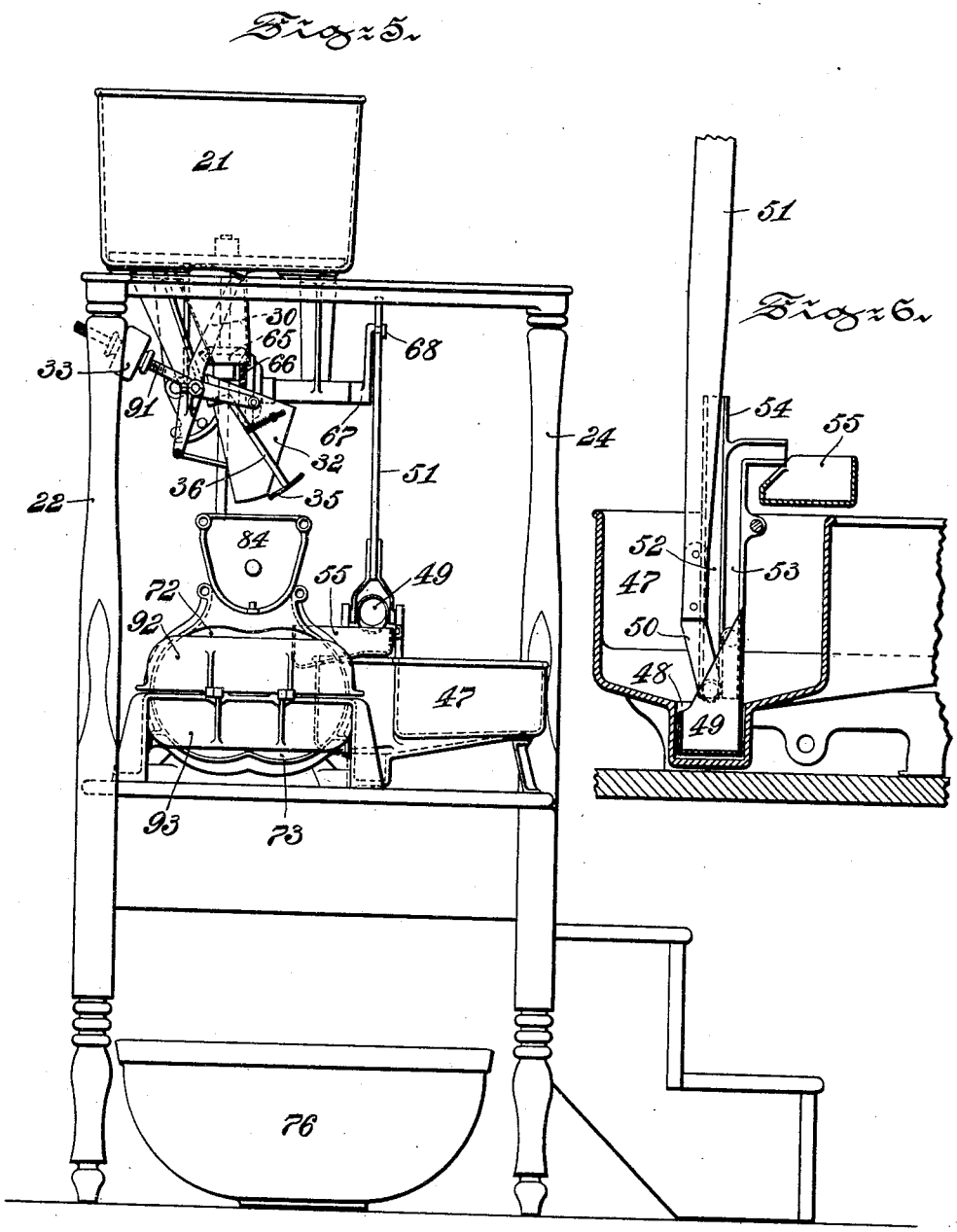

C. CHAMBERS, Jr.
DOUGH MIXING MACHINE.
APPLICATION FILED AUG. 16, 1906.
921,202.
Patented May 11, 1909.
6 SHEETS—SHEET 5.
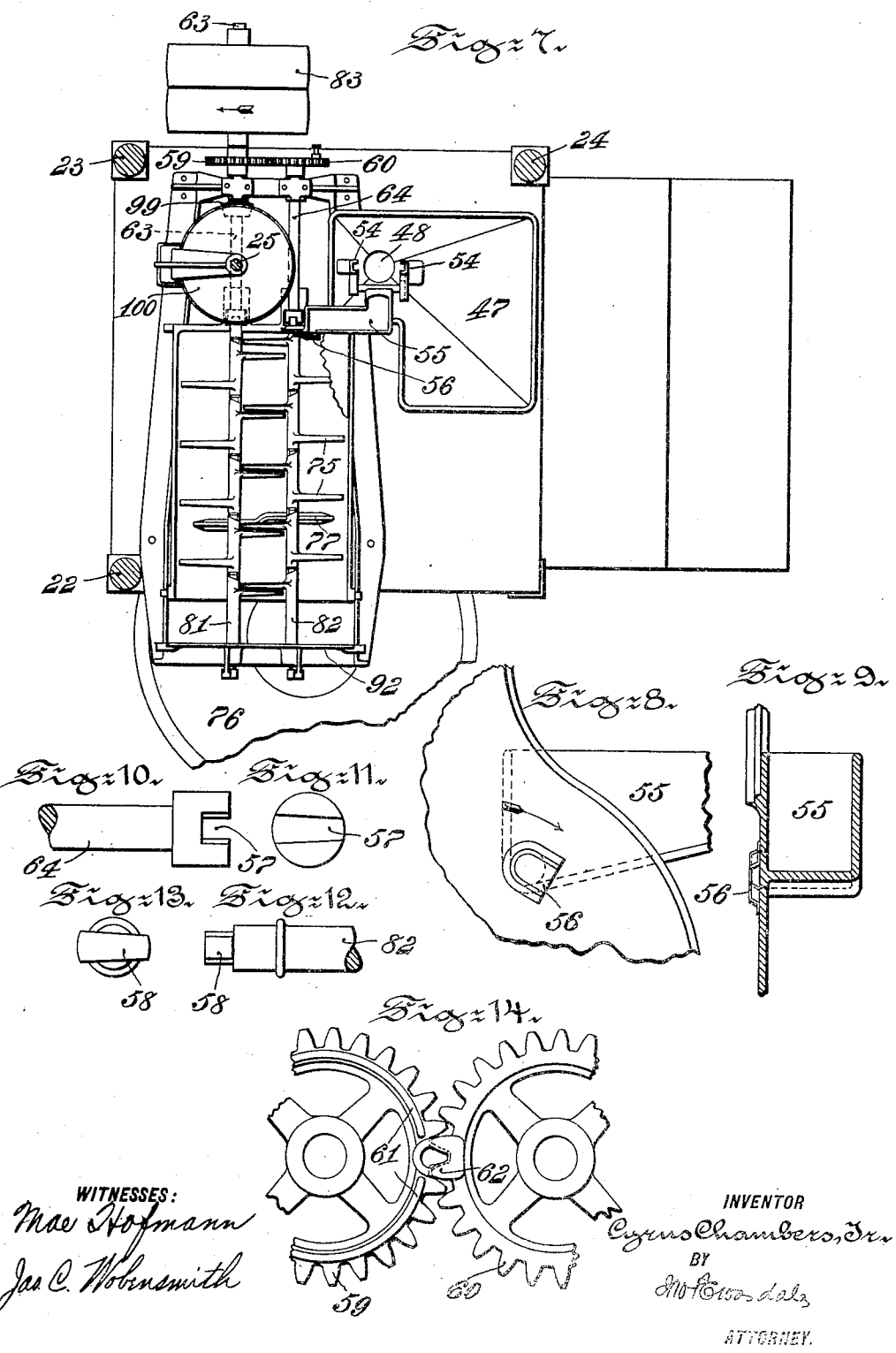

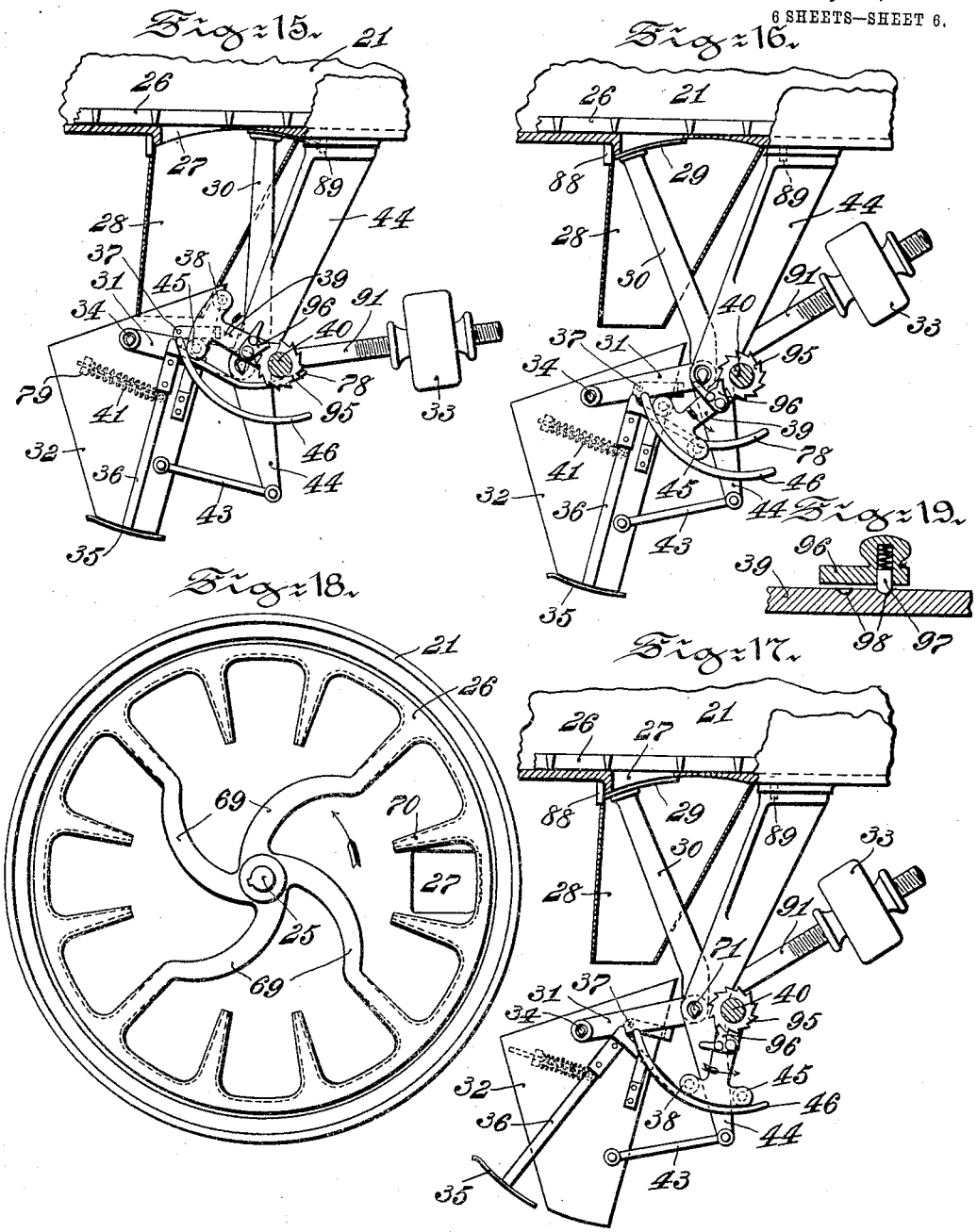

UNITED STATES PATENT OFFICE.

CYRUS CHAMBERS, JR., OF OVERBROOK, PENNSYLVANIA.

DOUGH-MIXING MACHINE.

No. 921,202.　　　　Specification of Letters Patent.　　　　Patented May 11, 1909.

Application filed August 16, 1906. Serial No. 330,801.

*To all whom it may concern:*

Be it known that I, CYRUS CHAMBERS, Jr., a citizen of the United States, residing at Overbrook, in the county of Montgomery and State of Pennsylvania, have invented a new and useful Dough-Mixing Machine, of which the following is a specification.

My invention relates to improvements in dough mixing machines.

My object is to provide improved means for automatically feeding and mixing together, in desired relative proportions, materials for the making of dough.

My invention comprises a receptacle for receiving the materials and means contained therein for mixing said materials and aerating the dough, in combination with adjustable means for automatically weighing or delivering flour in required quantities to said receptacle and automatic means for measuring and delivering, in required quantities, the liquid with its ingredients into the said receptacle.

My device comprises means for sifting the flour gradually into the mixing chamber so that the same will be uniformly mixed with the liquid delivered thereto.

My device also comprises means whereby the dough, sufficiently and properly formed, is discharged from said mixing chamber, so that the repetition of the mixing, kneading and aerating operation may be continued.

My device is especially adapted as a continuously operating machine, that is to operate upon charge after charge of relatively proportioned materials until any desired quantity or quantities of dough have been formed.

Referring to the drawings:—Figure 1 is a front side elevation of a device embodying my invention. Fig. 2 is a rear side elevation of the same. Fig. 3 is an end elevation at the driven end of the machine. Fig. 4 is a section on an enlarged scale on line 4, 4 of Fig. 3. Fig. 5 is an elevation of my device at the end at which the dough is delivered and opposite the driven end. Fig. 6 is a view similar to Fig. 4 with the bucket lowered into the well. Fig. 7 is a sectional plan view with the flour bin and air chamber removed. Fig. 8 is a fragmentary view of the discharge nozzle from the conducting spout. Fig. 9 is a section on line 9, 9 of Fig. 8. Fig. 10 is a plan view of the coupling end of the driving shaft. Fig. 11 is an end elevation of same. Fig. 12 is a plan view of the under side of the coupling end of the mixing shaft. Fig. 13 is an end elevation of same. Fig. 14 is a fragmentary view showing the device for the proper meshing of the gears of the mixing shaft. Fig. 15 is a side elevation of the scale hopper and associated mechanism in the closed preliminary position. Fig. 16 is a similar view in the closed secondary position. Fig. 17 is a similar view showing the scale hopper in the final or discharging position. Fig. 18 is a plan view of the flour bin and the stirring device. Fig. 19 is a sectional detail of pawl 96 and associated mechanism.

Similar numerals refer to similar parts throughout the several views.

Referring to the parts, in the order of their successive operations, 21 indicates the flour bin, circular in form, with a flat bottom, of such capacity as to hold the amount of flour necessary or desirable for one continuous run. This bin is elevated above the rest of the machinery and is supported upon extensions 22, 23 and 24 of three of the main posts of the machine. Through the center of the bottom of bin 21 projects a perpendicular shaft 25 to which is connected a stirring device 26 of peculiar construction, shown in Fig. 18, and more particularly described hereafter. The bin 21 is provided with the opening 27 through its bottom, communicating with the chute 28, whereby the flour is guided from the bin to the scale hopper 32. Opening 27 is provided with a slide valve 29 supported upon the outer extremity of arm 30 which extends from the center 71 of the weighing beam 31 of the scales. The position of arm 30 with respect to the position of the weighing beam is such that when the scale hopper 32 is in the preliminary or elevated position and counterweight 33 is in the lowered position, the valve 29 is maintained in the open position to permit of the flow of flour through opening 27 to scale hopper 32. Pins 88 and 89, secured to the underside of flour bin 21, encounter plate or valve member 29 to limit its movement in either direction. Scale hopper 32 is hung in the scale arms 31, on knife edges 34, as usual. Arms 31 are secured to shaft 90, to which is secured the beam 91. The counterweight 33 is adjustably attached to the scale beam 31 so that it may be moved toward or away from the axis of the scales as occasion may require, to weigh more or less flour at a charge. The extension of scale beam 31 from its axis to the counterweight is at an angle slightly above the horizontal line while the scale hopper is up and the counterweight down, in the preliminary position for weighing. When the scale is tipped, the weight moves into a position at a still greater angle with the horizontal line and nearer to the perpendicular line passing through the center of gravity of said scale hopper, so that said counterweight 33 will exert a less force against the scale hopper when in the second or lower position, than when in the preliminary position. The surplus power given to the scale hopper over the counterweight, when in said lower or secondary position, assures the closing of valve 29 beneath the flour bin, that is to say, the scale hopper in the first position forms a delicate weighing arrangement until commencing to tip. It is then provided with increasing abundance of power as it descends with its weighed flour to close valve 29 of the flour bin 21.

At the lower end of the scale hopper, which is normally open, is provided the swinging valve 35, hung at the end of the radial arms 36 pivoted at 37. This valve 35 is opened by the coöperation of roller 38 with cam member 78. Roller 38 is attached to arm 39 on shaft 40. The compression spring 41 is adapted to work in opposition to roller and cam member to cause the closure of valve member 35, when roller 38 has cleared cam 78 and the parts have assumed the initial position. Shaft 40 which causes the roller and cam movement of the valve 35 is driven by the worm gear 42, the worm of which is upon the perpendicular shaft 25 as shown in Fig. 3, hence the movement of this valve in no way interferes with the delicacy of weighing, but is operated positively, after the tipping of the scales into the open position, and is closed, as above stated, by the spring 41, which operates between the levers 36 and stud 79 secured to the walls of hopper 32. Shaft 40 is normally locked with arm 39 by the pawl 96, pivoted to arm 39, engaging with ratchet 95 keyed to shaft 40. This engagement is maintained by the spring plunger 97, see Fig. 19, engaging in one of the recesses 98 in arm 39, so long as the shaft 40 rotates in the proper or normal direction, indicated by the arrows in Figs. 15 and 16. In case however the machine should be operated in the wrong direction, the pawl is forced out of engagement with the ratchet, so that shaft 40 will move independently of arm 39, thus preventing the jamming of the friction rollers 38 and 45 under the cams 46 and 78, and otherwise straining the machine. A second recess 98 is provided in arm 39 to receive spring plunger 97, to maintain the pawl in such inoperative position until arbitrarily moved by the operator.

Another purpose of the pawl and ratchet relationship between shaft 40 and arm 39 is to provide for the arbitrary disengagement of arm 39 from shaft 40. When the machine is first started it is desirable that no flour be admitted to the mixing basin until the liquid from the liquid reservoir reaches the basin, so that the flour may not be sifted into a dry basin. Hence it is necessary to throw out the pawl operating the weighing device until this condition takes place. Again at the close of the run it is necessary to cut off the further admission of flour while the machine continues running, to complete the mixing and expel the dough therefrom. This is secured by the hand manipulation of pawl 96 at the beginning and toward the end of the run. It will be understood that the exact amount of liquid required is placed in the reservoir, and this governs the quantity of bread that is to be made at one run. The quantity of flour placed in the bin may be more than sufficient for such run, hence, by controlling the flour delivered from the bin to the mixing basin, all of the liquid may be used, while the surplus flour, not being perishable, may remain in the bin until wanted for the next run.

The scale hopper 32 is kept in a substantially perpendicular position by a link 43, connected near the lower end thereof and with the lower end of the stationary arm 44. This link 43 is substantially the same length as the scale arms 31, securing a parallel movement by the arm and link, whereby the scale hopper 32 is maintained in a perpendicular position, and yet the hopper allowed to rise and fall freely in the act of weighing.

To insure the descent of the scale hopper 32, in the event of insufficiency of flour in bin 21 to deliver a full load, or because of the sticking of machinery, a cam roller 45 is provided, carried on arm 39, operating against a cam 46 which is secured to the side of hopper 32, so that when the time arrives for the flour to be dumped from the weighing hopper the hopper is forced down and held in the depressed position for the operation of the opening of the hopper valve 35 as above described. When said arms 36 are swung back the lower part of scale hopper is open to permit the flour to fall by gravity into the sifter 84.

The sifting device consists of a hopper having a perforated bottom and a sifting bar for reciprocating over the same. The sifting device is supported in any suitable way above the air chamber 72 and mixing chamber 73. The sifting device does not extend the entire length of the air chamber or the mixing basin for the reason hereinafter specified.

A liquid tank 47 is L-shaped in form as seen in Fig. 7. At the bottom of the smaller arm thereof is located a well 48 into which the measuring bucket 49 is adapted to dip. The bottom of the tank 47 is inclined in all directions toward the well, so that practically all the liquids contained in the tank will run to the well and will be taken up by the measuring bucket. It is to be noted that the well is of such shape and dimension as to readily accommodate the bucket therein and at the same time form an approximately close fit therewith, so that when the bucket is forced down into the well all liquid contained therein is forced up over the edge of the bucket and into it, thus enabling it to move all the liquid from the tank. Tank 47 is of such dimensions as to hold the required amounts of liquid necessary for one continuous run of the machine.

The measuring bucket 49 is preferably cylindrical in form, with one side of its top margin projecting a considerable distance beyond the balance of said top margin. The distance between the lower edge or portion of the top of the bucket multiplied by its area determines the capacity of the bucket and the long side forms a lip or spout by which the liquid is delivered to the conducting trough or funnel 55, whence it is discharged into the mixing basin 73 of the machine. The bucket 49 is carried by a yoke 50 and connecting rod 51 and is guided by friction wheels or lugs projecting into the channels 52 in the perpendicular guide members 54 on each side of the well. Another friction wheel or lug projects into channel 53, in one of said guide members 54. This channel 53 is parallel with channel 52, except at its upper extension, where it is turned at right angles. By this means the bucket is held perpendicular when ascending and descending through the liquid into the tank and into the well. When the bucket is raised however to near its upper throw the curved or bent channel 53 causes it to turn into a position inclined slightly beyond the horizontal, thereby allowing the contents of the bucket to empty into the conducting trough or funnel 55 leading to the mixing basin of the machine. It will thus be seen by each stroke of the bucket 49 an exact quantity of liquid is raised and emptied into the basin.

The mixing basin and mixing blades are substantially the same as that shown in my pending application, Serial No. 281,256 filed October 4, 1905, except that the shafts 81 and 82 project beyond the end of the basin 73 and are carried in an outrigger 80, see Fig. 1, so that the dough may drop from the end of the basin and fall before reaching the extreme end of the said mixing shafts. Plates 92 and 93 are secured to the outrigger structure at a distance from the end of the air chamber to prevent any dough from clinging to the blades 75 or being forced over the end bearings. Beneath and against the portion of each shaft 81 and 82, projecting beyond the air chamber, is secured a scraper plate, such as indicated by 94 in Fig. 1, for scraping any dough which may otherwise cling to this portion of the shaft. At the lower side of the basin 73 and near the outer end thereof is located a low dam 77, the object of which will be more clearly described hereafter.

The conducting member 55 for conveying the liquid from the measuring bucket 49, enters the air chamber 72 above the center line of the mixing shafts 81 and 82 and therefore wholly above the line between the air chamber and mixing basin, see Fig. 3. The object of this being to prevent the stopping of the inlet by the dough in the basin. The mouth 56 of this inlet into the air chamber is of peculiar construction as shown in Fig. 8. That is to say, it is an opening downward or obliquely in the direction of travel of the mixing blades as indicated by the arrow so that there is no tendency for the dough to be forced into the spout. The sifter is independent of the air chamber, and is detachably connected therewith by means of the usual spring catches. The air chamber is attached to the mixing basin in the usual manner and is held by spring catches.

The mixing shafts 81 and 82 have at their ends to which power is supplied, peculiar couplings, whereby they are connected to the driving shafts 63 and 64 in such manner as to be readily detached, for the purpose of cleaning. As it is necessary that these shafts 81 and 82 shall have a certain position relative to one another so that the knives 75 passing through the same plane at the admission end of the basin, shall not interfere with one another, and also that one mixing shaft shall not be placed in the machine in the place that belongs to the other. This coupling is so designed as to connect the mixing shafts with the driving shafts only in one position, by means of tapered slots 57 and tapered tenons 58 as clearly shown in Figs. 10, 11, 12 and 13. In order that the shafts may not be placed one in the position of the other these slots are made of a different size so that the one with the large tenon cannot be put in connection with the driving shaft having the small slot.

Power is applied to the driving shaft 63 by the pulley 83 from any suitable source of power and the two shafts 63 and 64 are caused to rotate relatively to one another by the gear wheels 59 and 60 having thereon the usual recessed rim 61 and long tooth or projection 62 coöperating therewith as shown in Fig. 14 to secure their proper assembling.

Power is transmitted from the driving shaft 63 by means of bevel gears 99 and 100 to a perpendicular shaft 25 extending up to and through the bottom of the flour bin 21. The upper end of this shaft connects to the stirring device 26 shown in Fig. 18 by means of a feather and keyway. Said stirring device being fitted loosely thereto so that it may lay by gravity on the bottom of the flour bin and adapt itself to any inequalities or want of alinement that may occur.

Power to operate the crank for lifting and lowering the measuring bucket is transmitted from the perpendicular shaft 25 by means of bevel gears 65 and 66, one of which 66 is located on the horizontal shaft 67 at the outer end of which is the crank 68 for operating the measuring bucket 49.

The operation of my device is as follows:— Flour is placed in the bin 21 and the proper mixture of water, milk, yeast, lard, salt, sugar or whatever ingredients are desired to be added in liquid form to the flour are placed in the tank 47. Power being applied to shaft 63 through pulley 83, the rotation of the stirrer 26 causes the flour to pass through opening 27 and chute 28 into scale hopper 32, the weight 33 having first been adjusted to counterbalance a required amount of flour. When the amount of flour charged in the scale hopper 32 is sufficient to overcome the counterbalancing effect of weight 33 the scale hopper falls or descends into position shown in Fig. 16 which causes the closing of the valve opening 27 and shuts off the further supply of flour from bin 21. A further rotation of shaft 40 caused by the worm 42 coöperating with pinion 88 causes the movement of arm 39 and the consequent coöperation of roller 38 with cam member 78 causing the movement of valve gate 35 into the open position as shown in Fig. 17 whereupon the flour contained in scale hopper 32 is discharged into the top of the sifting hopper 84. At the same time with each revolution of the crank 68 the bucket is made to dip from the tank 47 a fixed quantity of liquid and discharge the same through conductor 55 and air chamber 72 into the mixing basin 73, where it is thoroughly mixed with the flour by the mixing blades 75. It is obvious that the consistency of the dough produced will depend upon the relative proportion of flour and liquid, which is controlled by the adjustment of the counterweight 33. For mechanical reasons the amount of liquid discharged with each revolution of the crank 68 is constant. The formation of the arms 69 of stirrer 26 is such as to force the flour engaged thereby toward the circumference of the bin. The spuds or short arms 70 extend from the rim toward the center and have a length equal to the width of the opening 27, so that the flour lying in the path of travel of these arms is swept over the edge of opening 27. Flour is thus continuously and positively fed through valve opening 27 and chute 28 as long as valve member 29 is in the open position. The constant dipping of the bucket 49 into the well 48 causes a thorough agitation of the liquid and its ingredients. A thorough mixture of the liquid is thereby maintained. As the mixing of the flour and liquid progresses the dough is moved toward the outlet end of basin 73 by the inclination of the knives 75 causing a feeding of the material in the direction indicated by the arrows in Fig. 7. The knives 75 also operate to lift up the dough as the same becomes viscous or ropy and to draw it apart and aerate it, say at about one-third of the distance from the liquid inlet end, and the continual addition of flour throughout the balance of the length of the sifter supplies the requisite amount to stiffen up the dough and make it of the consistency desired. When the dough has passed the sifter 74, there is no longer any flour added to that portion of the dough which is now thoroughly mixed and aerated between the end of the sifter 74 and the outlet end of basin 73. When the dough has reached this point it is forced out of the end of the basin and dropped into a suitable bowl or tray 76, from which it may be taken away in such quantity as is desired to raise in one vessel or at one time. The low dam 77, near the outer end of the mixing basin and beneath the outer end of the sifter, serves to prevent the liquid from running out before it has been thickened or stiffened by flour when first starting the machine. By replenishing the flour in the bin 21 and the liquid in tank 47 the machine may be kept continuously in motion as long as desired and thus any quantity of dough can be produced with a comparatively small machine.

It will be observed that the perforated surface of the sifter is much less than the width of the basin or mixing chamber as shown in Fig. 3 and that its length is only about two-thirds the length thereof as shown in Fig. 1. Consequently the area of the sifting surface is only about one-fourth of the area of a horizontal plane through the center of the mixing basin.

What I claim is:—

1. In a dough mixing machine, the combination of a mixing receptacle, mixing mechanism operating therein and reciprocating devices for delivering fixed quantities of materials thereto operating relatively to the mixing mechanism and to each other.

2. In a dough mixing machine, the combination of a mixing receptacle, means for intermittently charging liquid thereto, and means for weighing and delivering to said receptacle charges of flour, said charging devices acting relatively.

3. In a dough mixing machine, the combination of a mixing receptacle, mixing mechanism operating therein, a liquid containing vessel and means for delivering intermittent charges of liquid therefrom to the mixing receptacle and a device for intermittently delivering required quantities of flour thereto operating relatively to the mixing mechanism.

4. In a dough mixing machine, the combination of a mixing basin and mixing mechanism operating therein, weighing mechanism for delivering flour thereto in measured quantities, means for delivering liquid thereto in measured quantities, and actuating means for causing a relative operation of the flour and liquid delivering means with respect to each other.

5. In a dough mixing machine, the combination of a mixing basin and mixing mechanism operating therein, weighing mechanism for delivering flour thereto in measured quantities, means for delivering liquid thereto in measured quantities, actuating means for causing a relative operation of the flour and liquid delivering means with respect to each other, and adjustable means for varying the required charge of the weighing device.

6. In a dough mixing machine, the combination of a mixing basin, mixing mechanism operating therein, means for delivering separate weighed charges of flour thereto, a liquid reservoir and mechanism operating relatively to the mixing mechanism and the flour charging means for transferring liquid in fixed quantities from the reservoir to the mixing basin.

7. In a dough mixing machine, the combination of a mixing basin, mixing mechanism operating therein, a liquid reservoir and mechanism operating relatively to the mixing mechanism for transferring liquid in fixed quantities from the reservoir to the mixing basin, said mechanism adapted to maintain an agitation of the liquid in the reservoir.

8. In a dough mixing machine, the combination of a mixing receptacle, mixing mechanism operating therein, a liquid supply and mechanism for transferring the liquid in fixed quantities from said liquid supply to the mixing receptacle, said transferring mechanism operating relatively to the mixing mechanism.

9. In a dough mixing machine, the combination of a mixing basin, mixing mechanism operating therein, an automatic flour weighing device and a liquid measuring device, each adapted to discharge required quantities of material to the mixing basin, and means for securing their relative operation.

10. In a dough mixing machine, the combination of a mixing basin, mixing mechanism operating therein, an automatic flour weighing device and a liquid measuring device, each adapted to discharge required quantities of material to the mixing basin, means for securing their relative operation, and adjustable means for varying the charge of flour necessary to cause the automatic actuation of the weighing device.

11. In combination with a dough mixing machine an automatic weighing and discharging device, a counterbalanced hopper, a counterweight therefor, having a position at rest near a horizontal line through its axis of movement, when the hopper is in the elevated position and adapted to move into a position approaching the vertical line through its axis of movement, to increase the power of the hopper over the counterweight as the hopper approaches the lower or discharge position, a valve mechanism for controlling the discharge of material into the hopper and means operated by the hopper for actuating said valve mechanism.

12. In a dough mixing machine, the combination of a mixing basin, mixing mechanism operating therein, an automatically actuated flour weighing device adapted to deliver to the mixing basin, a flour receptacle adapted to deliver to the weighing device, stirring mechanism operating in the receptacle for insuring said delivery, and actuating means for securing a relative operation of the stirring mechanism, weighing device and mixing mechanism.

13. In a dough mixing machine, the combination of a mixing basin and mixing mechanism operating therein, a counterbalanced hopper for weighing and delivering material to the mixing basin, a discharge port in said hopper and a valve for coöperating therewith and means for operating said valve, acting relatively to the mixing mechanism.

14. In a dough mixing machine, the combination of a mixing basin and mixing mechanism operating therein, a counterbalanced hopper for weighing and delivering material, a discharge port in said hopper, a valve for coöperating therewith and means for operating said valve, acting automatically by externally applied power.

15. In a dough mixing machine, the combination of a mixing basin and mixing mechanism operated therein, a liquid tank and a measuring bucket operated relatively to the mixing mechanism for dipping liquid from the tank and delivering it to the mixing basin.

16. In a dough mixing machine, the combination of a mixing basin and mixing mechanism operating therein, a liquid tank and a well draining said tank, a measuring bucket fitting snugly in said well and mechanism operating relatively to the mixing mechanism for dipping the bucket into said well and lifting it to discharge the same in the mixing basin.

17. In a dough mixing machine, the combination of a mixing basin and mixing mechanism operating therein, a liquid tank provided with a well therein, the bottom of said tank inclined toward said well so that the whole contents of the tank shall drain thereto, a bucket snugly fitting said well adapted to be lowered therein, mechanism for lowering said bucket and for lifting and discharging the same into the mixing basin.

18. In a dough mixing machine, the combination of a mixing basin, liquid measuring mechanism comprising a liquid supply, a measuring bucket suspended on trunnions traveling in vertically extending ways, and means connected with the bucket for maintaining the same in the vertical position when lowered and lifted into and out of the liquid supply, and then for tipping it into the discharge position to cause the transfer of its contents into the mixing basin.

19. In a dough mixing machine, the combination of a mixing basin, means for measuring and delivering flour and liquid to said mixing basin, a pair of mixing shafts operating in said basin and provided with mixing blades, so set that by their rotation the materials are forced continuously in one direction, and actuating means operating the measuring and delivering means and mixing blades relatively.

20. In a dough mixing machine, the combination of a mixing basin, mixing mechanism operating therein, a liquid tank with an inclined bottom, a well extending below the lowest point of said bottom, a bucket adapted to be lowered into and raised from said well having such exterior dimensions with respect to said dimensions of the well that when lowered into the well the liquid contained therein will be forced upwardly out of the well into the bucket.

21. In a dough mixing machine, the combination of a mixing basin, mixing mechanism operating therein, a liquid tank with an inclined bottom, a well extending below the lowest point of said bottom, a bucket adapted to be lowered into and raised from said well having such exterior dimensions with respect to said dimensions of the well that when lowered into the well the liquid contained therein will be forced upwardly out of the well into the bucket, and mechanism for moving the bucket and causing the same to discharge into the mixing basin.

22. In a dough mixing machine, the combination of a mixing basin, a funnel or conducting member connected therewith, a liquid supply adjacent thereto and means for transferring the liquid therefrom in measured quantities to the funnel and thence to the mixing basin.

23. In a dough mixing machine, the combination of a mixing basin, mixing mechanism operating therein and relatively operated means for delivering flour and liquid thereto, the mixing mechanism comprising blades having faces angularly disposed to cause a movement of the dough toward the discharge end of the basin, the basin being open at said discharge end and provided with a low dam therein at a distance from said discharge end approximately one-quarter of the longitudinal extension of said basin, substantially as and for the purpose specified.

24. In a dough mixing machine, the combination of a mixing basin, mixing mechanism operating therein, comprising a pair of mixing shafts, driving shafts coöperating therewith, means for disengageably coupling the mixing shafts with the driving shafts and a recessed rim connected with one shaft and a coöperating projection connected with the other shaft to secure their proper relative assembling.

25. In a dough mixing machine, the combination of a mixing basin and mixing mechanism operating therein, comprising a pair of mixing shafts, a pair of driving shafts and slot and tenon means for disengageably connecting said mixing shafts with their respective driving shafts, the tenon and slot of one pair of shafts being of different size than the tenon and slot of the other pair of shafts to prevent their interchanging.

26. In a dough mixing machine, the combination of a mixing basin, mixing mechanism operating therein, an automatically actuated weighing device for delivering flour thereto, adjustable means for controlling the amount of flour necessary for its automatic actuation, a measuring device for delivering liquid thereto, and actuating means for operating the delivering and mixing means relatively.

27. In a dough mixing machine, the combination of a mixing basin, mixing mechanism operating therein, a storage bin having a discharge aperture in its bottom, an agitator for causing the movement of flour to the aperture, said agitator consisting of a rotative body adapted to lie by gravity on the bottom of the bin, means for causing the rotation of the agitator, and automatic mechanism for conveying flour from the bin to the mixing basin.

28. In a dough mixing machine, the combination of a mixing basin, mixing mechanism operating therein, a storage bin having a discharge aperture in its bottom, an agitator for causing the movement of flour to the aperture, said agitator consisting of a rotative body adapted to lie by gravity on the bottom of the bin, a chute leading from said discharge aperture, a counterbalanced hopper for receiving material from the chute and delivering it to the mixing basin and a gate for said aperture controlled by the movement of the hopper.

29. In a dough mixing machine, the combination of a mixing basin, mixing mechanism operating therein, a liquid supply, mechanism for transferring liquid from the liquid supply to the basin, and a funnel or conductor for guiding said liquid into the basin having a nozzle directed away from the line of travel of the mixing mechanism.

30. In a dough mixing machine, the combination of a mixing basin, a pair of shafts with mixing blades operating therein, an air chamber surmounting the mixing basin, a sifting hopper surmounting the air chamber and adapted to deliver material therethrough to the mixing basin, a storage bin for flour having a discharge aperture in its bottom, an agitator for causing the movement of the flour to the aperture, said agitator consisting of a rotatable body adapted to lie by gravity on the bottom of the bin, and means for causing its rotation, a counterbalanced hopper for receiving the material from the bin, a chute for directing the material from the bin to the hopper, an adjustable weight connected with the counterbalanced hopper for securing the required amount of material to actuate said hopper, a valve for the aperture of the bin and mechanism operated by the hopper for causing its actuation, a discharge aperture at the base of the hopper and a spring controlled valve for same, mechanism for operating said spring controlled valve, the various parts being so associated that the counterbalanced hopper, when charged with a predetermined weight of material, will move in a substantially vertical direction and thereby cause the closure of the aperture of the bin, and then discharge its contents to the sifter, a liquid reservoir provided with a well, the bottom of the reservoir inclined to drain to said well, a bucket and mechanism for operating the same adapted to move into and out of the well and to lift an exact or measured quantity of liquid and discharge the same to the mixing chamber and mechanism for causing a desired relative actuation of the several parts.

CYRUS CHAMBERS, Jr.

Witnesses:
ISABEL CHAMBERS,
C. B. KELLER, Jr.